United States Patent
Liao et al.

(10) Patent No.: US 6,813,773 B2
(45) Date of Patent: Nov. 2, 2004

(54) PICKUP GUIDE RAIL TILT ADJUST MECHANISM WITH SCREW DISPOSED THROUGH A PRE-COMPRESSED SPRING FOR AN OPTICAL DISC DRIVE

(75) Inventors: Cheng-Yao Liao, Taipei (TW); Tzu-Nan Chen, Taipei (TW)

(73) Assignee: Lite-On It Corporation, Taipei (TW)

( * ) Notice: Subject to any disclaimer, the term of this patent is extended or adjusted under 35 U.S.C. 154(b) by 187 days.

(21) Appl. No.: 10/245,280

(22) Filed: Sep. 16, 2002

(65) Prior Publication Data
US 2003/0142615 A1 Jul. 31, 2003

(30) Foreign Application Priority Data

Jan. 25, 2002 (TW) ..................................... 91200764 U

(51) Int. Cl.⁷ .......................... G11B 7/08; G11B 7/085; G11B 7/09
(52) U.S. Cl. ....................................... 720/675; 720/677
(58) Field of Search ................................ 720/675, 677, 720/674, 672, 658, 676; 369/219, 249, 220, 44.21, 215, 244, 255, 219.1, 244.1, 249.1

(56) References Cited

U.S. PATENT DOCUMENTS

| | | | | |
|---|---|---|---|---|
| 5,982,735 A | * | 11/1999 | Tsai ........................ | 369/219.1 |
| 5,995,479 A | * | 11/1999 | Takizawa et al. ......... | 369/219.1 |
| 6,633,532 B1 | * | 10/2003 | Handa ...................... | 369/263.1 |
| 6,704,270 B2 | * | 3/2004 | Moriyama ............... | 369/249.1 |
| 2004/0052199 A1 | * | 3/2004 | Nakashima et al. ..... | 369/249.1 |

FOREIGN PATENT DOCUMENTS

JP 2002-230922 A * 8/2002

OTHER PUBLICATIONS

IBM TDB, "Fully Adjustable Focus Offset and Tilt", Nov. 1, 1995, v. 38, No. 11, pp. 323–324.*

* cited by examiner

*Primary Examiner*—Julie Anne Watko
(74) *Attorney, Agent, or Firm*—Thomas, Kayden, Horstemeyer & Risley

(57) ABSTRACT

A tilt adjust mechanism for an optical disc drive. The optical disc drive includes a base plate. The tilt adjust mechanism comprises a plurality of mounts, two guide rails, a plurality of pre-compressed springs, and a plurality of screws. Each of the mounts is disposed on the base plate. Each of the guide rails is disposed on the mount at both ends. Each of the pre-compressed springs is disposed in the mount. Each of the screws is disposed on the base plate through the mount and the pre-compressed spring so as to adjust the guide rail.

10 Claims, 6 Drawing Sheets

PICKUP GUIDE RAIL TILT ADJUST MECHANISM WITH SCREW DISPOSED THROUGH A PRE-COMPRESSED SPRING FOR AN OPTICAL DISC DRIVE

BACKGROUND OF THE INVENTION

1. Field of the Invention

The invention relates to an optical disc drive; in particular, an optical disc drive with a mechanism to allow a tilt angle between its optical pickup and turntable to be optimized.

2. Description of the Related Art

For optical recording and reproduction, an optical disc drive can read recorded information from optical discs such as LD (laser disc), CD (compact disc), DVD (digital versatile disc, or digital video disc), or the like using an optical recording medium. There also is a compatible disc drive which can read information from any one of those optical discs.

Among these optical discs, a numerical aperture NA of an objective lens, a thickness of substrate, an optimum reading laser beam wavelength, and the like are dictated by different specifications. To realize an optical pickup of a CD/DVD compatible drive, therefore, it is necessary to compensate at least two differences of the numerical aperture NA and the substrate thickness.

As stated above, an optical pickup for accessing both CD disc and DVD disc must include two light sources generating a different wavelength of light beams and two objective lenses with a different number of apertures. In the case where an optical pickup is provided with two light sources and two objective lenses, there are problems in that as the dimension of the optical pickup is enlarged, its structure becomes more complicated and manufacturing costs thereof increase. In order to solve the problems, there has been developed an optical pickup capable of making use of a single light source and appropriately controlling thenumerical apertures of the objective lens depending on the corresponding disc.

In addition, when the disc is placed on a tray and inserted into the disc drive, the disc within the tray is clamped on a turntable. Then, the optical pickup is guided by guide rails along a radial direction of the disc, and carries out a seek operation.

In this type of disc drive, a relative angle between the optical pickup and the disc must be adjusted so that a distance between the optical pickup and the disc loaded on the turntable becomes constant, in order to accurately read the information recorded on (that is, pit pattern formed on) the disc.

In other words, in an assembly line of the disc drive, after the turntable, the optical pickup and the like are assembled, a reflected light from a reference disc used for the positional adjustment is detected by the optical pickup in a state where the reference disc is clamped on the turntable. In this state, the mounting angle of the turntable is adjusted while a measuring unit (automatic collimator) measures an angular error of the reflected light from the reference disc detected by the optical pickup, so that the angle of the reflected light from the reference disc becomes a prescribed value.

A description will be given of a conventional tilt adjust mechanism applied to the disc drive.

FIG. 1 shows a conventional optical disc drive. The optical disc drive as shown in FIG. 1 comprises a spindle motor 10a, a first plate 11a, a screw 12a, a second plate 13a, and a spring 14a. The spindle motor 10a is disposed on the first plate 11a. The screw 12a is locked to the second plate 13a through the first plate 11a. The spring 14a is disposed between the first plate 11a and the second plate 13a. The screw 12a can adjust a tilt angle of the spindle motor 10a.

However, by means of the screw 12a, the tilt angle of the motor 10a cannot be accurately adjusted.

FIG. 2 and FIG. 3 show another conventional optical disc drive. The optical disc drive as shown in FIG. 2 comprises a guide rail 20a, a spring leaf 21a, a first screw 22a, a support 23a, a plate 24a, and a second screw 25a. The guide rail 20a is assembled with the spring leaf 21a at both ends. The spring leaf 21a is fixed on the support 23a with the first screw 22a passing through. The second screw 25a is disposed on the plate 24a and used to adjust a tilt angle of the guide rail 20a so as to optimize a tilt angle of an optical pickup of the optical disc drive.

However, in the optical disc drive as shown in FIG. 2 and FIG. 3, since the number of components is increased, costs are also increased.

SUMMARY OF THE INVENTION

In order to address the disadvantages of the aforementioned optical disc drive, the invention provides an optical disc drive with a tilt adjust mechanism so that tilt angle between the optical pickup and turntable can be optimized.

Accordingly, the invention provides an optical disc drive. The optical disc drive comprises a base plate, a plurality of mounts, two guide rails, a plurality of pre-compressed springs, and a plurality of screws. Each of the mounts is disposed on the base plate. Each of the guide rails is disposed on the mount. Each of the pre-compressed springs is disposed in the mount. Each of the screws is disposed on the base plate through the mount and the pre-compressed spring so as to adjust the guide rail.

In a preferred embodiment, the optical disc drive further comprises a plurality of supports. Each of the supports is disposed on the base plate, and each of the mounts is disposed on the support.

It is understood that each of the mounts is of plastic.

In another preferred embodiment, each of the mounts includes a first hole into which the guide rail is inserted.

In another preferred embodiment, each of the mounts includes a receiving portion and a second hole communicating with the receiving portion so that each of the pre-compressed springs is disposed in the receiving portion and each of the screws passes through the second hole and the pre-compressed spring.

In another preferred embodiment, this invention provides a tilt adjust mechanism for an optical disc drive. The optical disc drive includes a base plate. The tilt adjust mechanism comprises a mount, a guide rail, a pre-compressed spring, and a screw. The mount is disposed on the base plate. The guide rail is disposed on the mount. The pre-compressed spring is disposed in the mount. The screw is disposed on the base plate through the mount and the pre-compressed spring so as to adjust the guide rail.

BRIEF DESCRIPTION OF THE DRAWINGS

The invention is hereinafter described in detail with reference to the accompanying drawings in which.

DETAILED DESCRIPTION OF THE INVENTION

Figure 1:
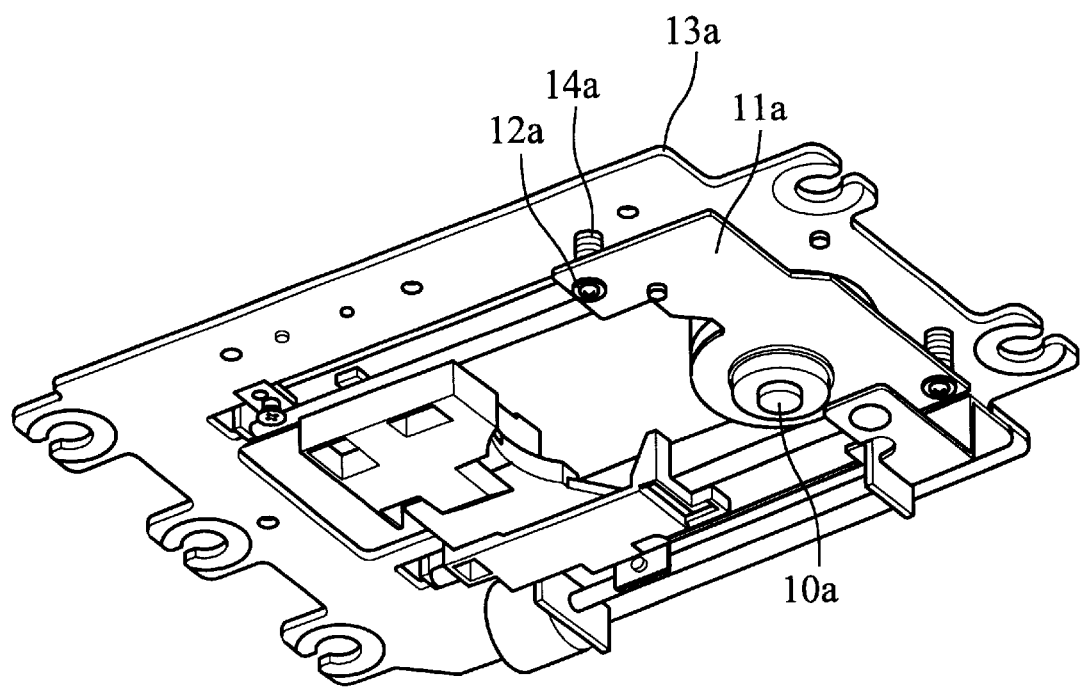
FIG. 1 is a schematic view of a conventional optical disc drive.
Figure 2:
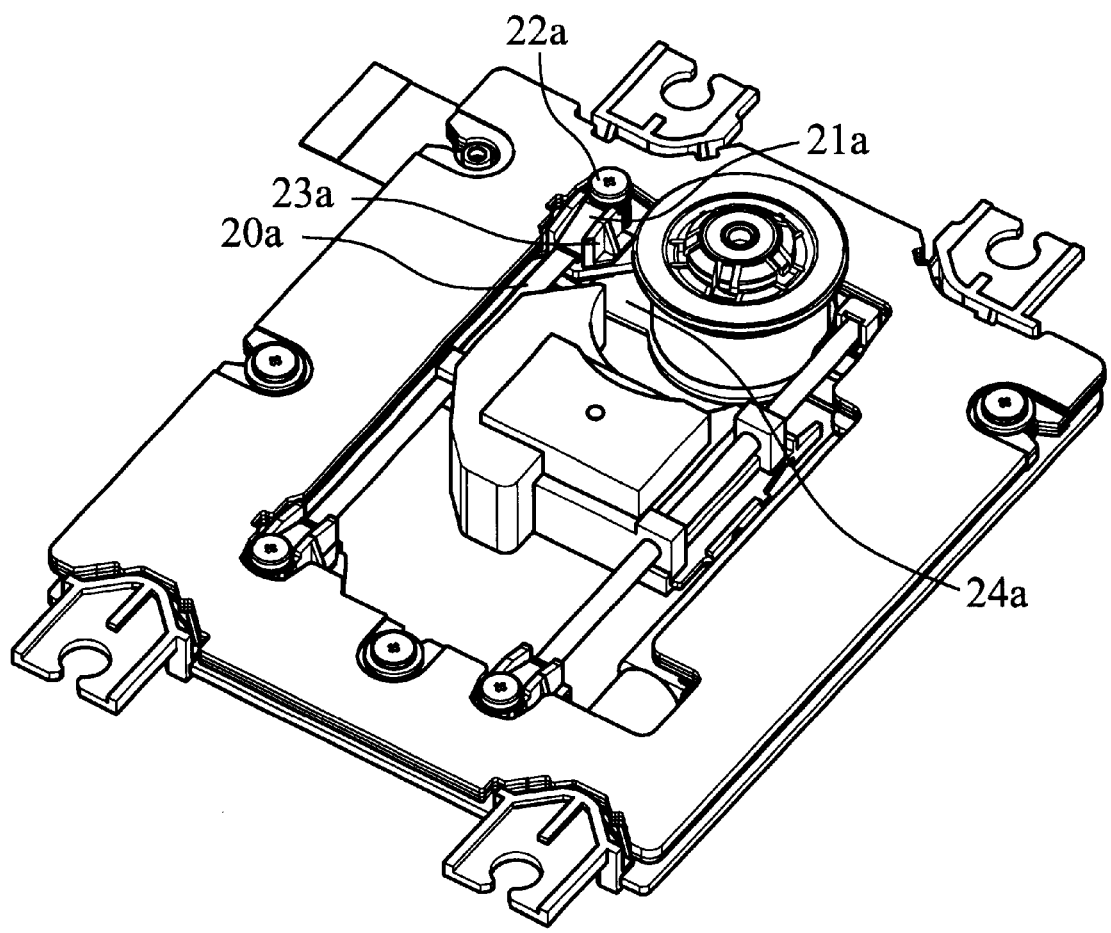
FIG. 2 is a schematic view of another conventional optical disc drive.
Figure 3:
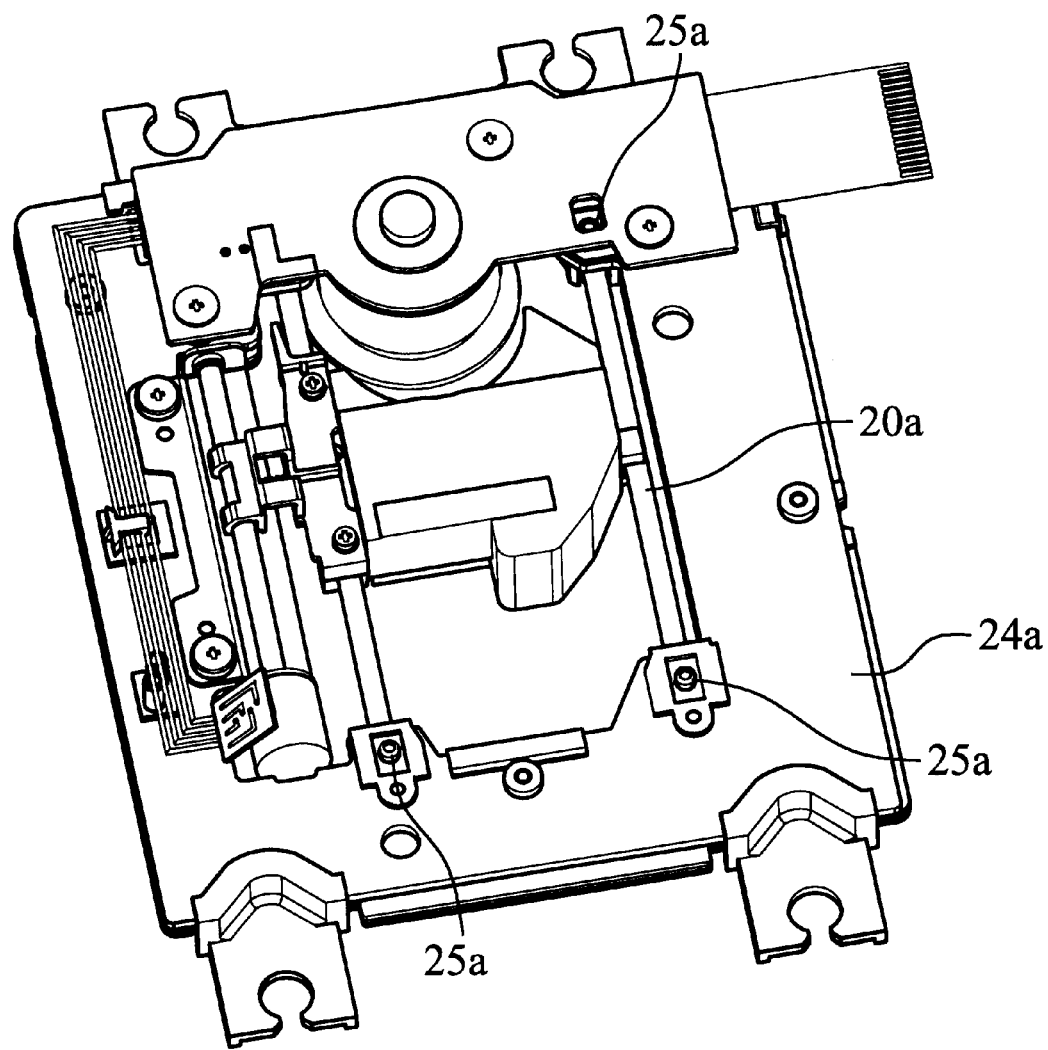
FIG. 3 is another schematic view of the optical disc drive in FIG. 2.
Figure 4:
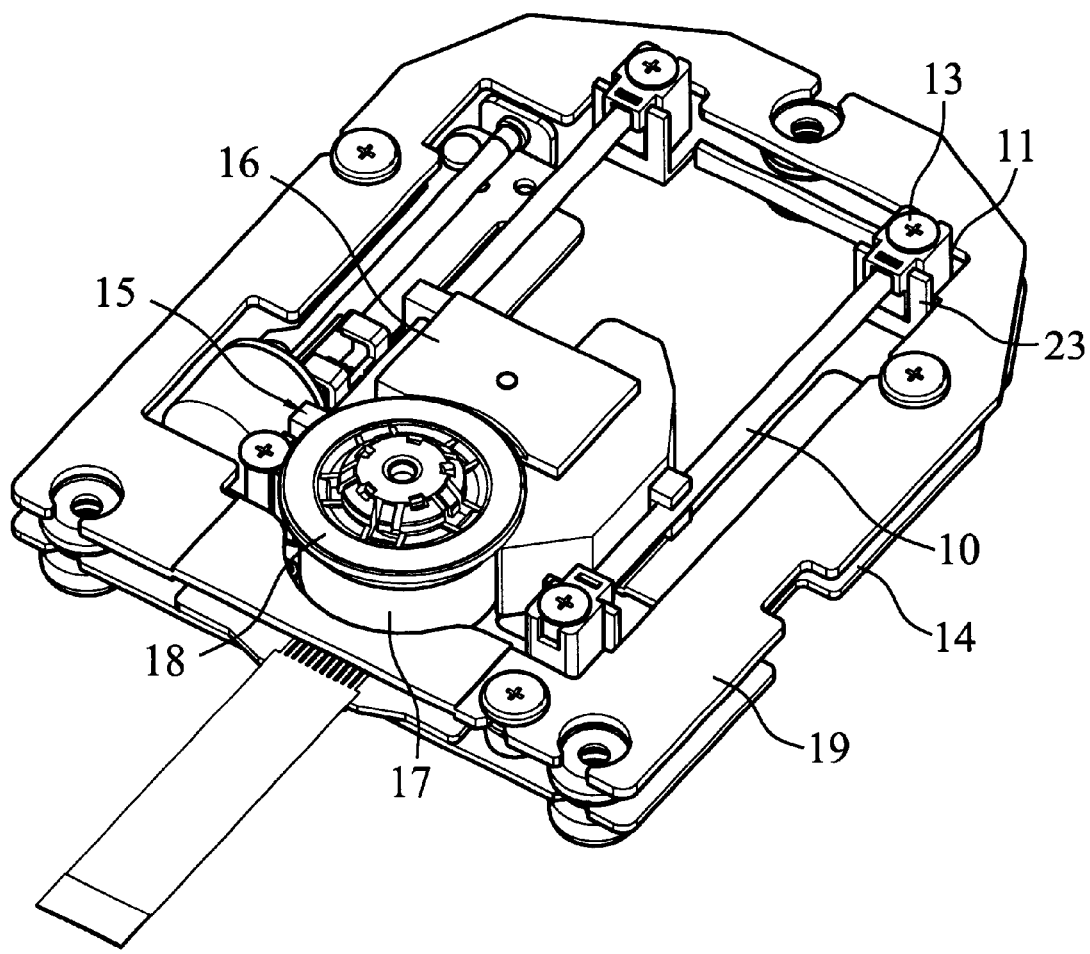
FIG. 4 is a schematic view of an optical disc drive as disclosed in this invention.
Figure 5:
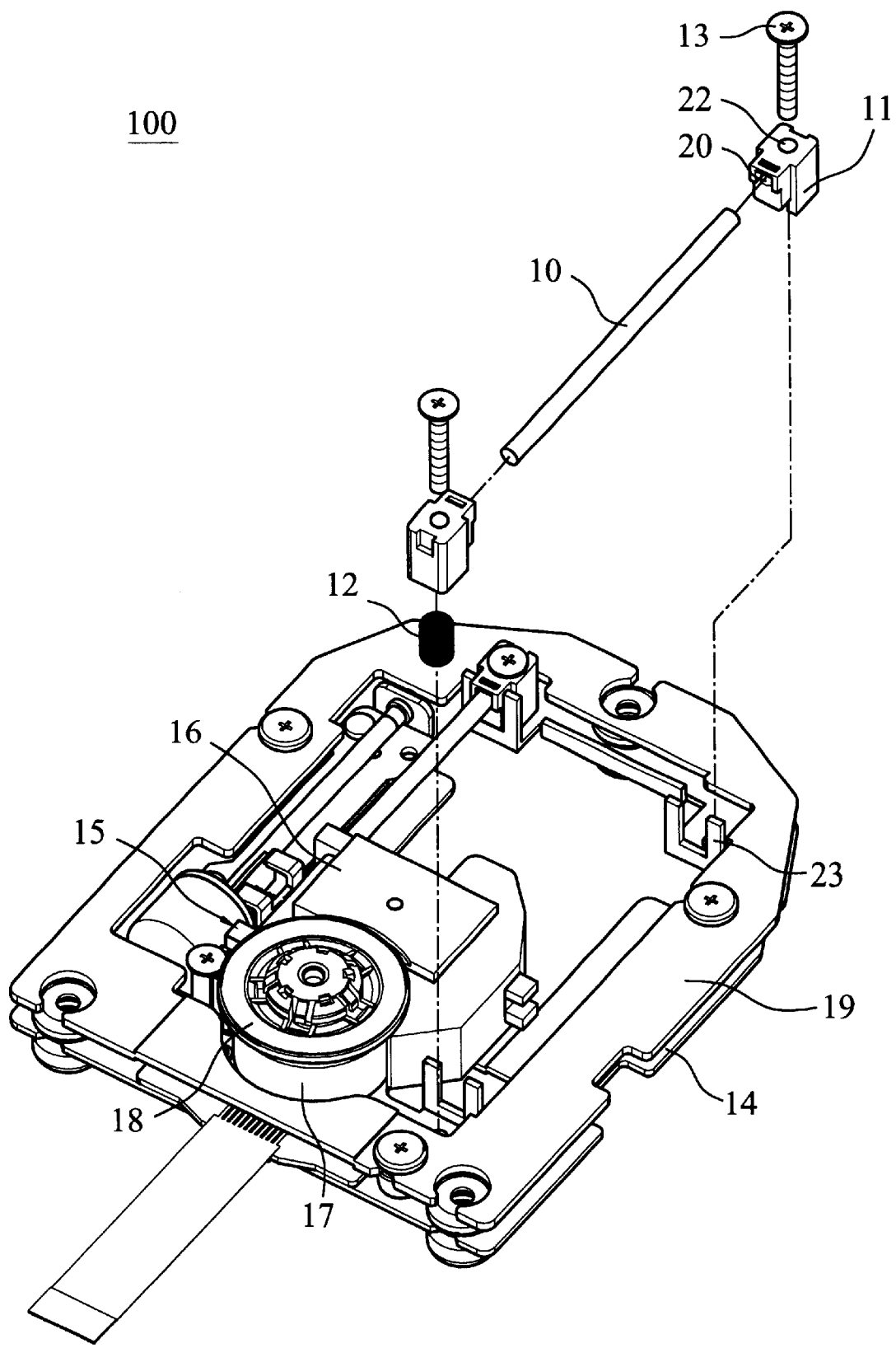
FIG. 5 is a partial exploded view of the optical disc drive in FIG. 4.
Figure 6:
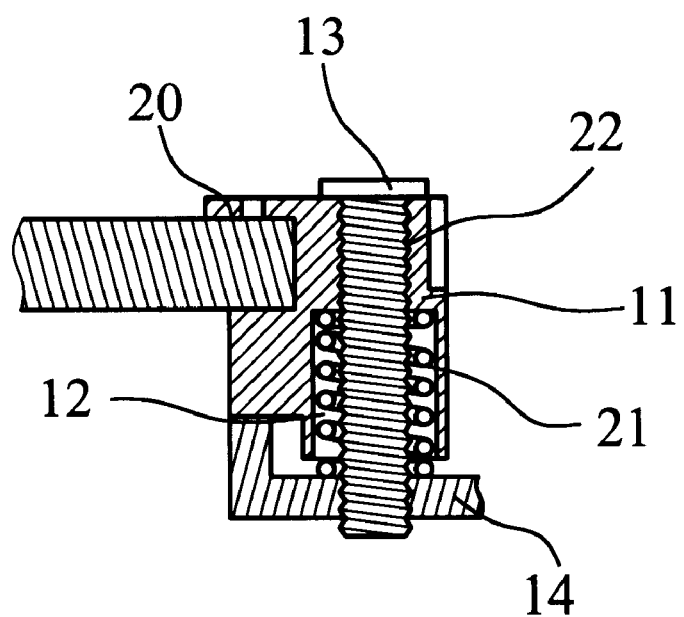
FIG. 6 is a partial cross section of the optical disc drive in FIG. 4.

Referring to FIG. 4, FIG. 5, and FIG. 6, a tilt adjust mechanism, for an optical disc drive 100 having a base plate 14, as disclosed in this invention is provided. The tilt adjust mechanism adjusts a tilt angle between a turntable and an optical pickup of the optical disc drive by pre-compressed springs. Also, the tilt adjust mechanism is disposed on the base plate 14 and comprises two guide rails 10, a plurality of mounts 11, a plurality of pre-compressed springs 12, and a plurality of screws 13.

The guide rails 10 are disposed on the base plate 14. The optical disc drive 100 further comprises a rotary unit 15 and an optical pickup 16. The rotary unit 15 is disposed on the base plate 14 and comprises a motor 17 and a turntable 18. The motor 17 of the rotary unit 15 rotates a disc (not shown) disposed on the turntable 18. The optical pickup 16 is disposed on the guide rails 10 in a slideable manner, and is driven by a transmitting mechanism (not shown). Specifically, the motor 17 rotates the turntable 18, and the transmitting mechanism (not shown) moves the optical pickup 16 along the guide rails 10 so that the optical pickup 16 can read data from the disc (not shown) disposed on the turntable 18.

The optical disc drive 100 further comprises an absorbing plate 19 disposed on the base plate 14. The absorbing plate 19 absorbs a vibration generated from the motor 17. It is noted the absorbing plate 19 is disposed on the base plate 14 in FIG. 4; however, it is not limited thereto. The absorbing plate 19 can be disposed under the base plate 14.

The mounts 11 are disposed on the base plate 14, and are of insulation material, such as plastic. The optical disc drive 100 further comprises a plurality of U-shaped supports 23. The supports 23 are disposed on the base plate 14, and the mounts 11 are disposed in the supports 23 respectively. Each of the mounts 11 is disposed around a corner of the base plate 14 and comprises a first hole 20. Thus, the guide rails 10 are inserted into the first holes 20 of the mounts 11 at both ends so as to be assembled on the mounts 11. A receiving portion 21 is defined in each of the mounts 11. Also, each of the mounts 11 comprises a second hole 22 at its top, and the second hole 22 communicates with the receiving portion 21.

The pre-compressed springs 12 are springs and are disposed in the receiving portions 21 of the mounts 11. Each of the pre-compressed springs 12 is located between the mount 11 and the base plate 14.

The screws 13 are screwed to the base plate 14 through the second holes 22 and the pre-compressed springs 12. By adjusting basic characteristics of the optical disc drive 100, such as jitter or tilt angle between the optical pickup 16 and the turntable 18, the screws 13 can adjust tilt angle of the optical pickup 16 so that the accuracy of the optical disc drive 100 can be optimized.

In addition, since the mount 11 is of insulation material, the optical pickup 16 is insulated from the base plate 14.

As stated above, the tilt adjust mechanism as disclosed in this invention adjusts the tilt angle of the guide rails so as to optimize the tilt angle of the optical pickup. Compared with the conventional optical disc drive, the structure of the optical disc drive as disclosed in this invention is simplified. Thus, number of the elements of the optical disc drive is reduced and the cost is saved. As a result, the tilt angle between the optical pickup and the turntable can be adjusted at a low cost.

While the invention has been particularly shown and described with reference to a preferred embodiment, it will be readily appreciated by those of ordinary skill in the art that various changes and modifications may be made without departing from the spirit and scope of the invention. It is intended that the claims be interpreted to cover the disclosed embodiment, those alternatives which have been discussed above, and all equivalents thereto.

What is claimed is:

1. An optical disc drive comprising:

a base plate;

a plurality of mounts disposed on the base plate;

a guide rail disposed on the mounts at both ends;

a plurality of pre-compressed springs disposed in the mount respectively; and a plurality of screws disposed on the base plate through the mount and the pre-compressed spring respectively so as to adjust the guide rail.

2. The optical disc drive as claimed in claim 1, further comprising:

a plurality of supports, disposed on the base plate, for the mount to be disposed thereupon.

3. The optical disc drive as claimed in claim 1, wherein each of the mounts is plastic.

4. The optical disc drive as claimed in claim 1, wherein each of the mounts includes a first hole for the guide rail to insert into.

5. The optical disc drive as claimed in claim 1, wherein each of the mount includes a receiving portion and a second hole communicating with the receiving portion so that each of the pre-compressed springs is disposed in the receiving portion and each of the screws passes through the second hole and the pre-compressed spring.

6. A tilt adjust mechanism for an optical disc drive having a base plate, comprising:

a mount disposed on the base plate;

a guide rail disposed on the mount;

a pre-compressed spring disposed in the mount; and a screw disposed on the base plate through the mount and the pre-compressed spring so as to adjust the guide rail.

7. The tilt adjust mechanism as claimed in claim 6, further comprising:

a support, disposed on the base plate, for the mount to be disposed thereupon.

8. The tilt adjust mechanism as claimed in claim 6, wherein the mount is plastic.

9. The tilt adjust mechanism as claimed in claim 6, wherein the mount includes a first hole for the guide rail to be inserted into.

10. The tilt adjust mechanism as claimed in claim 6, wherein the mount includes a receiving portion and a second hole communicating with the receiving portion so that the pre-compressed spring is disposed in the receiving portion and the screw passes through the second hole and the pre-compressed spring.

* * * * *